United States Patent [19]

Jurjevic et al.

[11] Patent Number: 5,315,756

[45] Date of Patent: May 31, 1994

US005315756A

[54] INSERTION MODULE FOR A WIRE ASSEMBLY DEVICE

[75] Inventors: Ivan Jurjevic; Kasriel Melamed; Joachim Wendt, all of Berlin, Fed. Rep. of Germany

[73] Assignee: Siemens Aktiengesellschaft, Munich, Fed. Rep. of Germany

[21] Appl. No.: 927,483

[22] PCT Filed: Feb. 19, 1991

[86] PCT No.: PCT/DE91/00141

§ 371 Date: Nov. 9, 1992

§ 102(e) Date: Nov. 9, 1992

[87] PCT Pub. No.: WO91/15043

PCT Pub. Date: Oct. 3, 1991

[30] Foreign Application Priority Data

Mar. 28, 1990 [DE] Fed. Rep. of Germany ....... 4010349

[51] Int. Cl.$^5$ ....................... B23P 19/04; H01R 43/00

[52] U.S. Cl. .................................... 29/748; 29/33 M; 29/845

[58] Field of Search ................... 29/33 M, 564.2, 747, 29/748, 754, 759, 760, 845, 881, 884; 140/93.1; 254/134.3 R, 134.3 CL, 134.3 FT

[56] References Cited

U.S. PATENT DOCUMENTS

| | | | |
|---|---|---|---|
| 4,653,159 | 3/1987 | Henderson et al. | 29/33 M |
| 4,936,011 | 6/1990 | Berry et al. | 29/748 X |
| 5,210,942 | 3/1993 | Emmerich et al. | 29/748 X |

FOREIGN PATENT DOCUMENTS

| | | | |
|---|---|---|---|
| 105045 | 3/1983 | European Pat. Off. | 29/748 |
| 305307 | 3/1989 | European Pat. Off. | 29/748 |
| 3703010 | 6/1989 | Fed. Rep. of Germany . | |
| 3826990 | 2/1990 | Fed. Rep. of Germany . | |
| WO88/05968 | 8/1988 | PCT Int'l Appl. . | |
| WO90/01818 | 2/1990 | PCT Int'l Appl. . | |

*Primary Examiner*—Peter Dungba Vo
*Attorney, Agent, or Firm*—Kenyon & Kenyon

[57] ABSTRACT

An insertion module for a wire-assembly device for gripping, positioning and joining to connector devices contact-connector elements disposed at the ends of electric leads, particularly leads for motor vehicles. A lead end provided with a contact-connector element, fed by a workpiece-carrier gripper, is transferred to an insertion module, which includes a centering gripper and an insertion gripper. The insertion module can travel horizontal and vertically and surrounds the contact-connector element during the insertion operation with a positive fit and inserts the contact-connector element into the connector device in an insertion plane and tests for a proper lock.

2 Claims, 2 Drawing Sheets

INSERTION MODULE FOR A WIRE ASSEMBLY DEVICE

BACKGROUND OF THE INVENTION

The invention relates to an insertion module for a wire-assembly device for gripping, positioning and joining to connector devices contact-connector elements disposed at the ends of electric leads.

DE-38 26 990 A1 discloses an insertion module that is comparable in function to the present invention. This module is used as an auxiliary device to join contact-connector elements in connector devices. This known insertion module is applied, in particular, to position so-called crimp snap-in contacts by means of a displacer element in pole chambers of plug-connector housings. To center the contacts, the displacer element is driven with a guide tip in front of the area of the connector device's pole chamber. The subsequent insertion of the contact-connector element into the pole chamber causes the guide tip of the displacer element to spread out. On the one hand, this spreading action serves to guide the contact-connector element when it is joined to the connector device. On the other hand, the resulting displacer effect is supposed to displace wires of other contacts that may be situated in front of the pole chamber. Therefore, this insertion module is essentially a positioning aid, which is in particular used for contacting so-called multiconductor plugs by crimp snap-in contacts.

Furthermore, WO-A-88/05968 (priority: DE 37 03 010) discloses a device for installing contacts in plug-connector housings in which the lead connected to one contact is gripped by a gripper and the contact can be positioned by a positively driven swivel operation in front of the insertion location in the plug-connector housing. The gripper is then driven until the contact initially arrives in the plug-connector housing. A subsequent tensile test checks for proper insertion. This device is particularly suited for comparatively rigid leads with correspondingly adjusted contacts, which are to be introduced into the plug-connector housing in a single plane.

The present invention is directed to an insertion module for wire-assembly devices that can fulfill much more rigorous requirements, both with respect to the actual insertion operation as well as with respect to the manufacturing of contact-connector elements having any type of construction so that contact-connector elements can be manufactured in connection with the corresponding connector leads.

SUMMARY OF THE INVENTION

The present invention provides an insertion module for a wire-assembly device for gripping, positioning, and joining a contact-connector element disposed at the end of an electric lead to a connector device. The insertion module comprises a centering gripper for gripping the contact-connector element with a positive fit. The centering gripper has inner positive-locking parts and outer positive-locking parts that are movable relative to each other in the direction of the longitudinal axis of the locking parts and which are adapted to the configuration of the contact-connector element. The inner and outer positive-locking parts are together movable in an opening or closing direction. An insertion gripper for engaging a lead end is disposed outside of the location of the contact-connector element. An adjustment limit stop denotes a final insertion position of the contact-connector element in the connector device. The contact connector element is locked in the connector device when it is in the final insertion position. The insertion gripper approaches the adjustment limit stop and, after the final insertion position is reached, the insertion gripper is movable with an adjustable tensile force in a direction opposite to the insertion direction to test for a proper lock.

Of fundamental importance to the invention is the centering operation, which represents a considerable improvement over the known insertion module. In this operation, the centering gripper surrounds the part of the contact-connector element situated in the immediate insertion area with a positive fit in order to subsequently bring about the actual joining of the contact-connector element to the connector device by means of the insertion gripper. The insertion gripper engages with the lead end outside of the area of the contact-connector element. By approaching the adjustment limit stop, the insertion gripper, which engages, therefore, with the lead end of the particular connector lead independently of the type and form of the contact-connector element, guarantees a nearly constant positioning of all the contact-connector elements inside the connector device to be fabricated. Moreover, this wire-assembly device enables the manufacturing sequence for producing the connector leads to be further improved because of the so-called locking test. Immediately after the contact-connector element is joined to the connector device, this test checks for the proper locking position of the assembled parts by testing the effect of a tensile force exerted in a direction opposite to the insertion direction. Contact-connector elements that do not lock into place immediately reveal an error in manufacturing. The manufacturing sequence can be stopped using known techniques and the faulty connector devices, or alternatively the defective contact-connector elements, can be removed from the manufacturing process.

According to another aspect of the invention, a separate insertion module is provided for each lead end of a connector lead. As a result, the insertion modules can be each controlled independently of one another to position and join the contact-connector element in its respective connector device. Accordingly, two independently controllable insertion modules are provided for a single connector lead; thus, there is one separate insertion module for each lead end. With regard to the manufacturing of the connector leads, these two independently controllable insertion modules render the wire-assembly device of the invention capable of being virtually completely programmable in terms of feeding the leading ends into the connector device. The connector leads can, therefore, be joined to more than two lead ends and may contain several different connector devices.

DETAILED DESCRIPTION

Figure 1A:
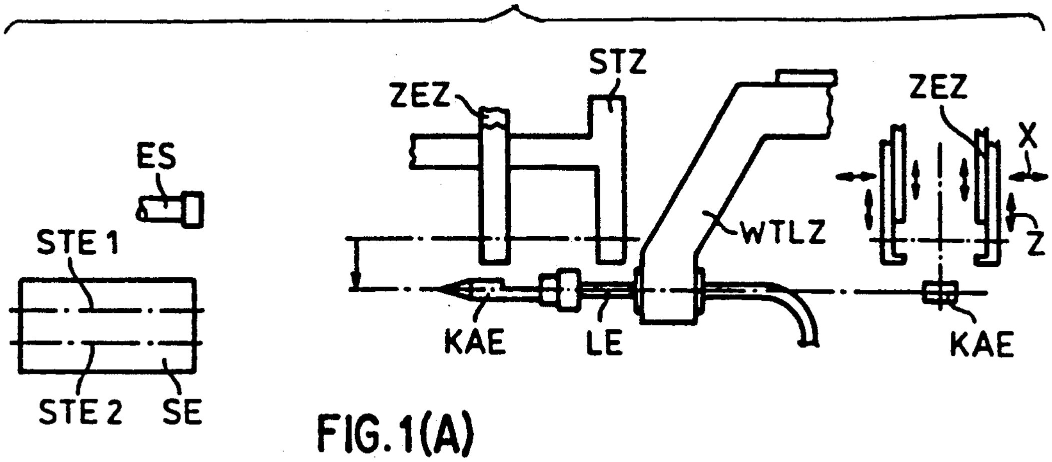
FIGS. 1(*a*)–(*e*) illustrate a sequences of stages in the operation of the insertion module for a wire-assembly device constructed according to the principles of the present invention.
Figure 1B:
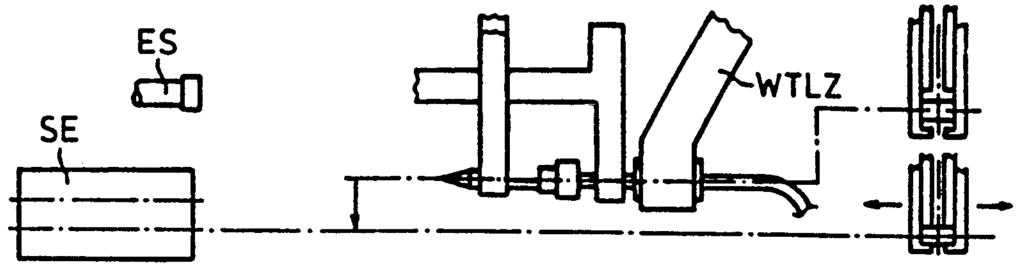
Figure 1C:
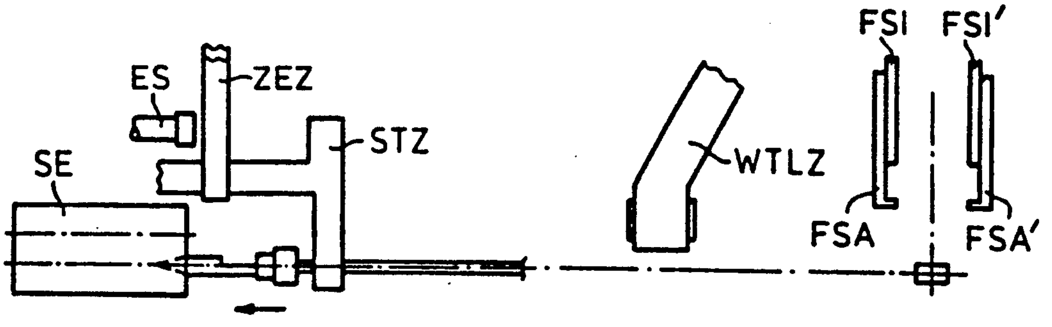
Figure 1D:
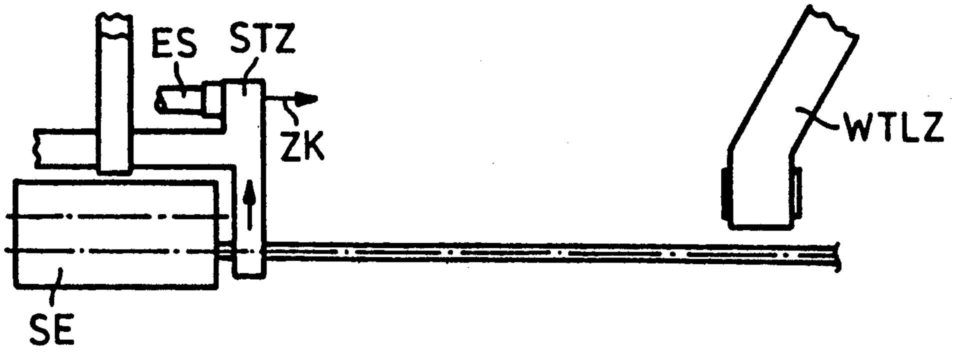
Figure 1E:
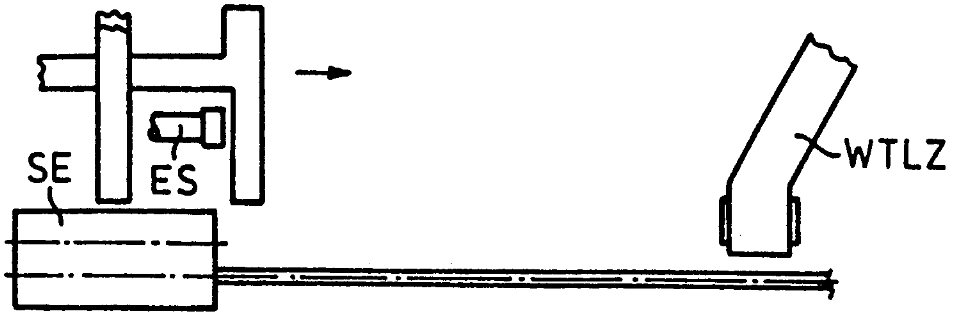

The Figure illustrates one embodiment of the workpiece-carrier gripper WTLZ of the present invention. The first stage in its operation is shown at the top and the subsequent four stages are shown therebelow. The carrier gripper WTLZ brings up the lead end LE with the electrically connected contact-connector element KAE to the insertion module which comprises the insertion gripper STZ and the centering gripper ZEZ. On the right side of the Figure, the centering gripper ZEZ is shown from the front. Around the centering gripper ZEZ are disposed inner and outer positive-locking parts FSI, FSA, or alternatively FSI', FSA', which are able to move relative to each other in the vertical direction. Moreover, the capability of the inner and outer positive-locking parts FSI, FSI' and FSA, FSA' to travel horizontally in the X direction can be distinguished.

The left-most portion of the Figure shows the connector device SE, with the various insertion planes ST1, ST2 indicated by dot-dash lines. Above the connector device SE is shown the adjustment limit stop ES. The significance of this limit stop ES will be described below in greater detail.

The method of operating the insertion module will be clarified in greater detail on the basis of the five important operating stages. Situated in the starting area, represented by the first operating stage, is the insertion module with its insertion gripper STZ and its centering gripper ZEZ disposed outside of the lead end area LE. As indicated in the right portion of the Figure above, the centering gripper ZEZ is retained in the open state. The direction of the arrow (not designated) in the first operating stage indicates that the insertion gripper STZ and the centering gripper ZEZ are driven into the area of the center axis of the lead end LE, so that the outer positive-locking parts FSA, FSA'—designated in the third operating stage—completely surround the contact-connector element KAE. The outer positive-locking parts FSA, FSA' are subsequently driven in the horizontal direction X to the contact-connector element KAE, as shown in the representation of the second operating stage in the top area. Next, the inner positive-locking parts FSI, FSI' are guided in the vertical direction Z up to the contact-connector element KAE until this element is completely gripped with a positive fit by the centering gripper ZEZ. To be able to drive the insertion module with the insertion gripper STZ and the centering gripper ZEZ, for example, into the second insertion plane STE2, the workpiece-carrier gripper WTLZ is opened and the insertion module is driven up, together with the contact-connector unit KAE, into the area of the second insertion plane STE2, which is defined in the first operating stage. To introduce the insertion operation, as indicated in the third operating stage, the centering gripper ZEZ is driven out of the area of the contact-connector element KAE in its open state and the insertion gripper STZ is driven in the direction of the arrow, together with the contact-connector element KAE, into the connector device SE.

It is apparent from the fourth operating stage that the introduction of the contact-connector element KAE into the connector device SE is restricted by the adjustment limit stop ES for the insertion gripper STZ. With this adjustment limit stop ES, the subsequent contact-connector elements KAE can be driven in the same way inside the connector device SE to the same depth. After the contact-connector element KAE has been locked into place inside the connector device SE (in a manner not shown), the insertion gripper STZ is moved in a direction opposite to the insertion direction with a tensile force that can be adjusted in advance, thus allowing a locking test to be performed. Consequently, the contact-connector element KAE is checked to determine if it is securely positioned inside the connector device SE. In case of an error, the insertion operation for this connector device SE is immediately interrupted, and the defective connector lead is removed together with connector device.

After this locking test, the insertion gripper STZ is driven out of the area of the lead end LE, as indicated in the fifth operating stage. After the insertion module travels in the direction of the arrow, the starting position is again reached, as depicted in the first operating stage, and the insertion module is ready to perform the next insertion operation.

What is claimed is:

1. An insertion module for a wire-assembly device for gripping, positioning, and joining a contact-connector element disposed at the end of an electric lead to a connector device, said insertion module comprising:

a centering gripper for gripping the contact-connector element with a positive fit, said centering gripper having inner positive-locking parts and outer positive-locking parts that are movable relative to each other in a direction along a common longitudinal axis of the locking parts, said locking parts are adapted to conform to the configuration of the contact-connector element, said inner and outer positive-locking parts being together movable in an opening or closing direction;

an insertion gripper for engaging a lead end disposed outside the contact-connector element;

an adjustment limit stop denoting a final insertion position of the contact-connector element in the connector device, said contact connector element being locked in said connector device when in said final insertion position, whereby said insertion gripper approaches the adjustment limit stop and after said final insertion position is reached is movable with an adjustable tensile force in a direction opposite to the insertion direction to test for a proper lock.

2. A wire-assembly device for gripping, positioning, and joining a plurality of contact-connector elements to a plurality of connector devices, each of said contact-connector elements being disposed at the end of one of a plurality of electric leads that together form a connector lead, said wire-assembly device having an insertion module for each of said plurality of electric leads, each of said insertion module comprising:

a centering gripper for gripping one of the contact-connector elements with a positive fit, said centering gripper having inner positive-locking parts and outer positive-locking parts that are movable relative to each other in a direction along a common longitudinal axis of the locking parts, said locking parts are adapted to conform to the configuration of the contact-connector element, said inner and outer positive-locking parts being together movable in an opening or closing direction;

an insertion gripper for engaging one of the lead ends disposed outside the contact-connector element;

an adjustment limit stop denoting a final insertion position of the contact-connector element in the connector device, said contact connector element being locked in said connector device when in said final insertion position, whereby said insertion gripper approaches the adjustment limit stop and after said final insertion position is reached is movable with an adjustable tensile force in a direction opposite to the insertion direction to test for a proper lock, said insertion modules being controllable independently of one another to position and join its corresponding contact-connector element in its respective connector device.

* * * * *